US008595290B2

(12) United States Patent
Weinryb et al.

(10) Patent No.: US 8,595,290 B2
(45) Date of Patent: Nov. 26, 2013

(54) SYSTEM AND METHOD FOR MANAGING DISCUSSIONS USING MESSAGING SERVICES (75) Inventors: Neta Weinryb, Raanana (IL); Arnon Yaar, Tel Aviv (IL)

(73) Assignee: Shoes and Ships Ltd., Raanana (IL)

(*) Notice: Subject to any disclaimer, the term of this patent is extended or adjusted under 35 U.S.C. 154(b) by 385 days.

(21) Appl. No.: 12/989,078

(22) PCT Filed: Apr. 22, 2009

(86) PCT No.: PCT/IL2009/000437
§ 371 (c)(1),
(2), (4) Date: Oct. 22, 2010

(87) PCT Pub. No.: WO2009/130698
PCT Pub. Date: Oct. 29, 2009

(65) Prior Publication Data
US 2011/0040846 A1    Feb. 17, 2011

Related U.S. Application Data (60) Provisional application No. 61/047,105, filed on Apr. 23, 2008.

(51) Int. Cl.
*G06F 15/16* (2006.01)
(52) U.S. Cl.
USPC ............................ 709/203; 709/206; 709/204
(58) Field of Classification Search
USPC .......................................... 709/203, 206, 204
See application file for complete search history.

(56) References Cited

U.S. PATENT DOCUMENTS

| 7,603,413 | B1* | 10/2009 | Herold et al. ............... 709/204 |
| 2003/0028525 | A1 | 2/2003 | Santos et al. |
| 2004/0117444 | A1* | 6/2004 | Goodman et al. ............ 709/204 |
| 2005/0273503 | A1 | 12/2005 | Carr et al. |
| 2007/0043878 | A1 | 2/2007 | Carlson et al. |
| 2007/0244980 | A1 | 10/2007 | Baker, III et al. |
| 2008/0010344 | A1 | 1/2008 | Wherry et al. |
| 2008/0034040 | A1 | 2/2008 | Wherry et al. |
| 2008/0063201 | A1 | 3/2008 | Wormald et al. |

(Continued)

OTHER PUBLICATIONS

Kalai et al.,"New Poly(ADP-ribose) Polymerase-1 Inhibitors with Antioxidant Activity Based on 4-Carboxemidobenzimidazole-2-ylpyrroline and -tetrahydropyridine Nitroxides and Their Precursors", J. Med. Chem., 52, pp. 1619-1629 (2009).

(Continued)

*Primary Examiner* — Ian N Moore
*Assistant Examiner* — Hien Nguyen (57) ABSTRACT System and method of creating online discussion sessions between users of messaging services, who do not necessarily know of each other prior to the discussion. The session includes exchanging messages between users in the context of a predefined subject. The method enables: embedding a communication interface (CI) to user's messaging services; initiating a discussion session, where the user initiates the discussion by using the embedded CI and defining the subject by creating a massage using the messaging service; transmitting the initial message, through the CI to the main discussion manager; searching for suitable other candidate users for participating the initiated discussion session, associated with the subject, according to predefined rules, where the suitability includes a combination of relevancy of the other user for participating in the defined discussion session, according to said defined subject, and availability of the other user to participate; creating and managing the online discussion session.

17 Claims, 6 Drawing Sheets

(56) References Cited

U.S. PATENT DOCUMENTS

| | | |
|---|---|---|
| 2008/0091692 A1 | 4/2008 | Keith et al. |
| 2008/0091834 A1* | 4/2008 | Norton |
| 2008/0155030 A1* | 6/2008 | Fortier et al. ............... 709/206 |
| 2009/0055485 A1 | 2/2009 | Tsai et al. |

OTHER PUBLICATIONS

Pacher and Szabo, "Role of Poly(ADP-ribose) polymerase 1 (PARP-1) in Cardiovascular Diseases: The Therapeutic Potential of PARP Inhibitors". Cardivascular Drug Reviews, 25 ,pp. 235-260 (2007).

* cited by examiner

SYSTEM AND METHOD FOR MANAGING DISCUSSIONS USING MESSAGING SERVICES

CROSS REFERENCE TO RELATED APPLICATION

This application claims the benefit of international application No. PCT/IL09/000,437 filed on Apr. 22, 2009 claiming the priority of U.S. Provisional Patent Application No. 61/047,105, filed Apr. 23, 2008, which is incorporated herein by reference in its entirety.

BACKGROUND

1. Field of the Invention

The present invention generally relates to messaging communication technology and more particularly to managing multi-user discussions using one or more messaging technologies.

2. Discussion of Related Art

Messaging services such as Instant messaging (IM) are a form of communication enabling users to communicate with one another in real time through text, voice and/or video messages. The messages are conveyed by terminals of the communicating users connected over a communication network (e.g. the internet, cellular network, etc.), where the users use GUI based messaging applications run by their terminals to initiate communication and to receive and transmit messages. Some IM and other messaging services provide an indication of the availability of parties which users can communicate with.

IM applications and services such as "Messenger" or "Skype" enable users to register to each service, where the IM service supports communication between users registered to the IM service. IM services allow their users to communicate through various communication and discussion messaging techniques such as text messaging, video and/or audio messaging. The messaging is online and is delivered in real time or near real time.

Each member (registered user) may have a personal friends-list indicating the member's friends who are also registered to the messaging service, where the communication details (e.g. IP addresses) of all members in the friends-list are known in the system operating the service. Accordingly, to send a message via, for example, the Messenger service, the member simply selects a friend from the friends-list and inputs a text message, where the Messenger service transmits the message to the selected friend.

Recently, social networks such as Facebook, MySpace, Flicker and the like, take up a major role in the world of communication. Most social networks apply IM technologies to allow their members to transmit and receive messages in real time.

BRIEF SUMMARY

According to one aspect of the invention, there is provided a computer implemented method of creating online discussion sessions between users of at least one electronic messaging service, wherein the discussion session includes exchange of messages between at least two users in the context of one pre-defined subject within a defined time period, where one of the users is the initiator of the discussion, where the users do not necessarily know of each other prior to the discussion session. The method may comprise of: embedding at least one communication interface in the user's messaging service, wherein said communication interface is a virtual entity enabling the establishment a discussion session through a main discussion manager, which enables managing discussions sessions between users; initiating a discussion session, wherein the user initiates the discussion by using said embedded communication interface and defining the discussion subject by creating a massage using the messaging service interface; transmitting said inputted message, wherein said message is transmitted by the embedded communication interface to the main discussion manager; searching for suitable other candidate users for participating the initiated discussion session, associated with said defined subject, according to predefined rules, wherein said main discussion manager carries out said search, and wherein said suitability includes a combination of relevancy of the other user for participating in the defined discussion session, according to said defined subject, and availability of the other user to participate; and creating and managing an online discussion session between the initiating user and at least one other suitable user, using the at least one messaging service, wherein said main discussion manager supports the discussion by providing the users with a communication messaging platform, which enables utilizing at least one messaging service for exchanging messages through said discussion manager between the users participating in the initiated discussion session.

The managing of each discussion may include terminating the discussion session according to predefined termination rules which may be based, for example, discussion duration limits, users' behavior in the discussion (e.g. identification of termination words such as "bye" in the content of the messages in the discussion), etc.

According to another aspect of the invention, there is provided a system for creating online discussion sessions between users of at least one electronic messaging service, wherein each discussion session includes exchange of messages between at least two users in the context of one pre-defined subject within a defined time period, wherein the users use terminals through which said discussion sessions are performed. The system may comprise:

a main discussion manager, which is a computerized module;

at least one main server enabling to operate said main discussion manager; and at least one messaging service provider, The main discussion manager may enable embedding communication interfaces (CI) in messaging services interfaces of users registered to said at least one messaging service, thereby enabling to support and manage discussions between users, and wherein said embedded CI enables the user to initiate a discussion session and define the discussion subject by creating a massage using the messaging service interface; transmit the message to the main discussion manager via said CI; search for suitable other candidate users for participating in the initiated discussion session, associated with said defined subject, according to predefined rules, wherein said main discussion manager carries out the search, and wherein the suitability includes a combination of relevancy of the other user for participating in the defined discussion session, according to the defined subject, and availability of the other user to participate; and create and manage the initiated online discussion session between the initiating user and at least one other suitable user, using the at least one messaging service, wherein the main discussion manager supports the discussion by providing the users with a communication messaging platform, which enables utilizing at least one messaging service for exchanging messages through the main discussion manager between the users participating in the initiated discussion session, wherein said managing includes terminating the discussion session according to predefined termination rules defining said time period of the discussion session.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "Figs."), wherein.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In other modules, well-known methods, procedures, components and circuits have not been described in detail so as not to obscure the teachings of the present disclosure.

The present invention, in some embodiments thereof, provides a system and a method for creating and supporting discussion sessions through messaging services (such as instant messaging (IM) services), which include messaging between users participating in each session, where the session is initiated by one of the users (referred to hereinafter as the "initiator user"). The system and method may enable the initiator user to transmit an initial message (e.g. a question) and searching for most suitable other candidate users for participating in the initiated discussion session (e.g. for answering the question). To do so the present invention, according to embodiments, enables embedding communication interface (CI) (such as, for example, a BOT agent) in the messaging service interface of the messaging services used by the user in his terminal (e.g. PC, laptop, PDA, etc.). In case the CI is a BOT agent, the embedding may include embedding the BOT agent as a friend in the friends list of users' messaging services (e.g. in case the messaging services are IM services). The embedding may be carried out by the messaging service provider or by any other entity.

Prior to setting forth the detailed description of some embodiments of the invention, it may be helpful to set forth definitions of certain terms that will be used hereinafter.

"Messaging service" refers to any communication service enabling users to transmit and receive messages such as IM services, emailing services, etc.

"IM service" refers to any messaging service that enable users, registered to the service, to communicate by online inputting, transmission and receiving of content such as text, audio and/or media content, for example, IM services such as Skype, Messenger, Facebook, MySpace, ICQ and the like enabling chats, text messaging, SMS, video messaging, short messaging services (SMS), multimedia messaging services (MMS), and the like.

Most IM services and other messaging services such as emailing etc. are operable through the internet network and enable a user to register to the service by entering a nickname and by extracting the IP address of the user's terminal. The IM service provides an IM interface including (i) a communication interface enabling to initiate and receive discussion sessions (e.g. calls through voice over IP (VoIP), text messaging discussion sessions, and the like); and (ii) a friends-list (often called a "buddy-list") through which the user can communicate with all friends on his list.

A discussion session includes exchange of messages (e.g. text, audio and/or video messages) between users participating in the discussion session in the context of a subject. The subject may either be manually defined by the user (e.g. by inputting a subject word or selecting a subject out of a predefined list) and/or automatically identified by the system (e.g. by analyzing the content of the initial message such as identifying at least one meaningful word defining the context of the discussion etc.).

A communication interface (CI) enables communication between the client users with a main server or application (referred to a "module"), which enables creating and managing discussion sessions between the users. The CI may include input fields enabling the user to input information for facilitating the search for suitable participants in the discussion.

A BOT agent is a software code or program that can perform operations through a network (e.g. the internet). The BOT agent is a virtual entity enabling to communicate with the user.

Figure 1:
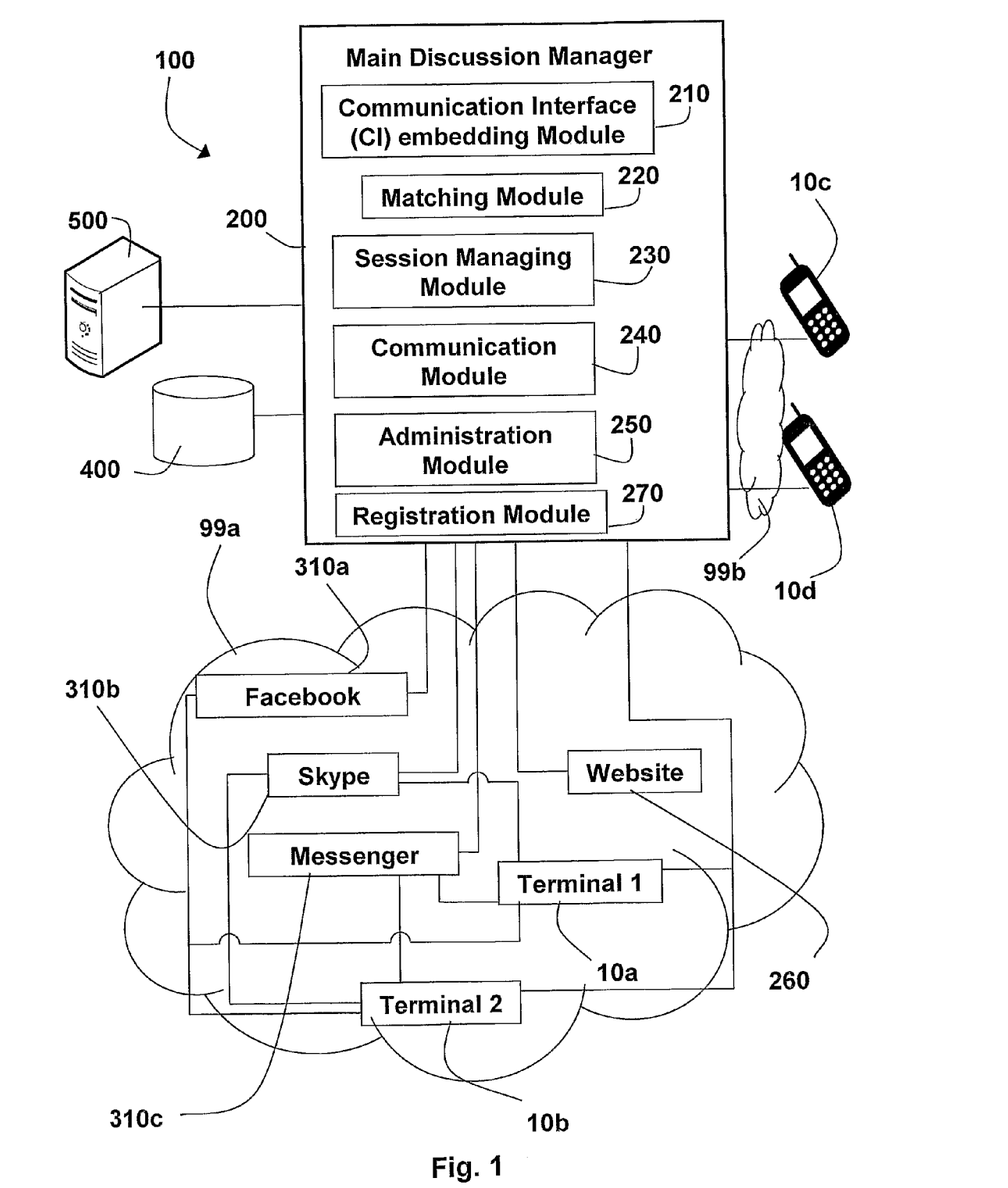
FIG. 1 is a block diagram, schematically illustrating a system for managing discussions between users using IM messaging services, according to some embodiments of the invention.

Reference is now made to FIG. 1, which is a block diagram, schematically illustrating a system 100 for creating and supporting discussion sessions between users using messaging services, according to some embodiments of the invention. The users may be clients of at least one IM service, using terminals such as 10a and 10b through which the IM services are performed.

According to embodiments, as illustrated in FIG. 1, the system 100 may comprise:

a main discussion manager 200, which is a computerized module;

at least one messaging service provider such as 310a, 310b and/or 310c;

a main server 500; and a web site 260.

According to embodiments, the messaging service provider 310a, 310b and/or 310c may enable embedding CIs such as BOT agents in messaging services' interfaces (e.g. in friends-lists of users registered in the IM services), thereby enabling to create, support and manage discussion sessions between users.

The embedded CI may enable a user to transmit an initial message (e.g. containing a question) through one of the messaging services 310a/310b/310c, where upon transmitting the message through the embedded CI in the user's messaging service interface, may transmit the initial message to the main discussion manager 200. The main discussion manager 200, in turn, may search for suitable other candidate users suitable for participating in the discussion session (e.g. suitable users for answering the question transmitted). Each initial massage may be associated with a subject, which defines the specific classification field of the discussion session (e.g. professional field etc.). The association may be carried out manually by the initiating user (e.g. by inputting the subject using the CI) or by analysis of the content of the initial message. The suitability of the other users for participating the discussion session may be calculated and searched according to predefined rules such as the relevancy of each user for participating (whether his profession or knowledge are in a field that is associated with the subject of the discussion) and the availability of the user to participate in the discussion session (whether the user has a history of not answering and/or the user's online state in his messaging service—whether he is online or not).

According to some embodiments, the main discussion manager 200 may further enable incorporating a matching level in the suitability calculations in addition to relevancy and availability of candidate participants for the discussion session. The matching level may represent the matching between the initiator user and the candidate participants, where the matching level may be calculated according to predefined matching criteria such as (i) according to profiles matching of the users (e.g. matching age ranges, gender, location, professional occupations and hobbies etc.); (ii) historical information regarding former discussion sessions between the initiator user and the candidate participating user if any former discussion between the users was identified; etc.

According to some embodiments, the server 500 may enable operating the main discussion manager 200, where the main discussion manager 200 may be a software tool that can be operated by the server 500 locally and/or remotely.

According to embodiments, the website 260 may be operatively associated with the main discussion manager 200 enabling users to register to the discussion services of the system 100 therethrough. The website 260 may include at least one registration interface enabling the user to register to the discussion services, input the user's personal details, terminals details and communication preferences.

According to some embodiments, the terminals 10a and/or 10b used by users can be any computerized and/or communication device enabling to process, receive, transmit and present data such as a PC computer, a laptop, a personal digital assistant (PDA), a mobile phone (e.g. 10c and/or 10d) and the like, where the terminal enables using IM services such as skype, Messenger, Short Messaging Service (SMS) and the like.

Each messaging service provider such as 310a/310b/310c may enable presenting an interface comprising: a friends-list comprising the names of all friends the user can communicate with through his personal account in the messaging service (e.g. IM service) where the interface enables the user to initiate communication with a friend from the list (e.g. by selecting the friend before/after inputting a message), as known in the art.

The system 100 may enable embedding a BOT agent as a virtual friend of the user with which the user can communicate, where the CI comprises the BOT agent.

The BOT agent may be a virtual user of a multiplicity of IM services types (e.g. a virtual Skype user, a virtual Messenger user, a virtual Facebook user etc.) thereby allowing communication via multiple messaging services.

All communication between the main discussion manager 200, the website 260, the terminals 10a and 10b and the IM service providers 310a, 310b, and 310c may be carried out over one or more communication network 99a such as the internet.

The managing of the discussion session (carried out by the discussion manager 200) may include terminating the discussion session according to predefined termination rules defining said time period of the discussion session.

According to embodiments, as illustrated in FIG. 1, the main discussion manager 200 may comprise:
  a communication interface (CI) embedding module 210;
  a matching module 220;
  a managing module 230;
  a communication module 240;
  an administration module 250; and
  a registration module 270.

According to some embodiments, the registration module 270 may enable the user to register to the discussion services (e.g. through the website 260).

The registration module 270 may operate a registration interface, enabling the users to voluntarily register to the discussion services of the system 100 by inputting personal details such as name, date of birth, profession, special fields of interest and expertise, to allow analyzing those details to create a profile of the user to further facilitate in identifying suitable user for participating in the discussion initiated by a user.

Upon registration, the CI embedding module 210 may enable the messaging services the user is registered at, to embed a CI in each of the interfaces of the messaging services presented to the user.

According to some embodiments, the matching module 220 may enable searching for most suitable users for participating a discussion session initiated by a user, according to predefined search rules.

According to some embodiments, the managing module 230 may provide a communication messaging platform for each initiated discussion session enabling to utilize at least one messaging service to allow users to communicate therethrough; managing and monitoring each discussion session between users by enabling to store parameters related to each discussion session such as, for example, the duration of the discussion session, the time between each response of the users, the content of the other users' messages and the like to allow ranking the quality of the messages received from each user participating in the discussion session. The managing module 230 may further enable inviting other users, found as suitable by the matching module 220, for participating in the discussion session and operate the communication module 240 to initiate communication between the participating users. The managing module 230 may further allow each user to rank other participating users in relation to the specific discussion session and the specific subject discussed. A history of each participating user in relation to the subject that was discussed may be accumulated for each user that has participated in discussion sessions creating a database comprising the history of users' discussions sessions information. Additionally, the system 100 may further allow participating users to rank each other—grading the other participants performances in the discussion session. Additionally or alternatively, the ranking may be carried out automatically be the system 100 taking into account the user's profile and the user's participating quality regarding the specific subject (e.g. the professional degree of the participating user, content analysis etc.). The ranks may be stored in a database 400, as illustrated in FIG. 1, where the database 400 may include various information details relating to history of users discussion sessions such as the ranks, the user's names and profiles, parameters of each discussion etc.

The monitoring may further include measuring the time that passes between last massage and current time, where the gap between the last message time parameter and the time parameter of the currently measured time creates a time-interval "T". The termination rules may include terminating the discussion session if the measured time-interval "T" between the last message and the current time exceeds a predefined threshold According to embodiments, the searching rules, operated by the matching module 220, may further include searching for candidate users of the highest ranks in relation to the subject of the initiated discussion session (meaning that the relevancy of the user may be calculated according to the user's profile as well as according to the user's past ranking in discussions of the same or similar subject).

The CI may further enable the user to classify the subject of his discussion by, for example, selecting a field from a predefined list of subjects and expertise (e.g. Gynecology, Finance, Stock Market, Child Care, Nutrition, etc.). The profiles of the users may include matching subjects of interest and/or fields of expertise of the users, enabling to search for suitable discussion participants by first finding users of matching fields and expertise to the classification of the question and then sort the users of matching fields and expertise by their ranking in relation to other questions in their history replied by these users in the same field. The division to fields may be hierarchal meaning that there may be general fields (e.g. Medicine) and sub fields (e.g. Gynecology, Cardiology, etc.).

According to embodiments, the communication module 240 may enable supporting and controlling communication in real time between users and managing the discussions, using various types of terminals and various types of communication networks such as the internet, WiMAX and the mobile network. According to embodiments, the communication module 240 may further enable transmitting answers and/or questions to users to the user's mobile phone using SMS messages via the mobile network 99*b*.

According to embodiments, the administration module 250 may enable predefined administrators (such as experts in various fields) to answer questions and manage discussions.

According to some embodiments, the users participating in each discussion session may be anonymous, represented in the discussion session by a non-identifying indicator such as a nick name, for example. The main discussion manager 200 may enable searching for suitable candidate participants without revealing personal details of the users to one another. In this case, the participants may exchange messages where each participant is indicated by a nick name or any other self defined or arbitrarily selected indicator (for example by numbers allocated to the participants).

Figure 2A:
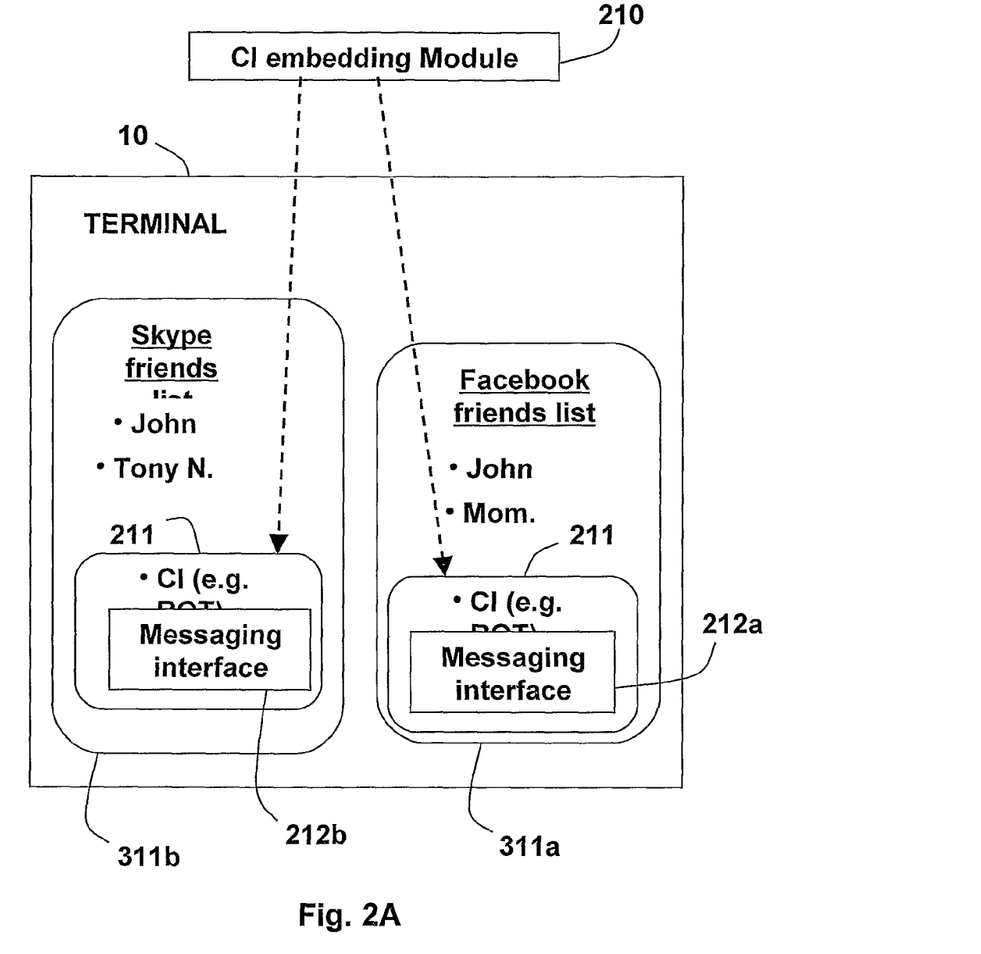
FIG. 2A schematically illustrates several IM services a user uses with a BOT agent embedded therein, according to some embodiments of the invention.

Reference is now made to FIG. 2A, which schematically illustrates messaging services interfaces including friends-lists 311*a* and 311*b* presented in a terminal 10 of a user, where the CI includes a BOT agent 211 embedded in those lists 311*a* and 311*b*.

As illustrated in FIG. 2A, upon registering to the discussion services of the system 100 a CI (e.g. BOT agent) 211 may be embedded in the friends list or in other areas of the interfaces of the messaging services that the user is registered to, enabling the user to input a message (e.g. a text message) addressing the message to the BOT agent CI 211. A messaging interface 212*a* and/or 212*b* may be presented to the user, where the interface 212*a/b* may be provided by the messaging service or by the CI 211.

Figure 2B:
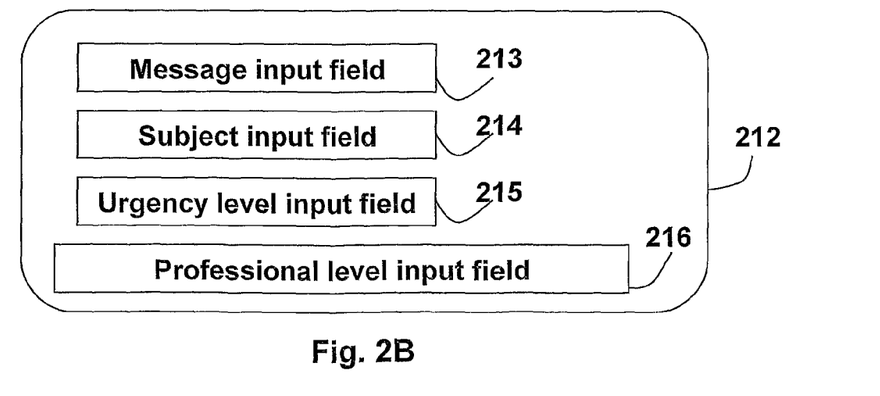
FIG. 2B schematically illustrates a questions interface, according to some embodiments of the invention.

Reference is now made to FIG. 2B, which schematically illustrates a messaging interface 212, according to some embodiments of the invention. The messaging interface 212 may include input filed such as:

a message input field 213 enabling the user to input his initial message;

a subject input field 214 enabling the user to categorize the professional or other subject the initiated discussion relates to (this may be an input field enabling the user to select a field classification and a sub classification form predefined lists);

an urgency level input field 215 enabling the user to define how urgent he requires the opening of a discussion (e.g. to receive an answer to an urgent question message); and a professional level input field 216 enabling the user to define the required professional level of the candidate participating users (e.g. whether the classification field of the session is the candidate's professional expertise and the level of that expertise (a Dr. a Prof., an amateur, etc.) the user may define a range of professional levels (e.g. an amateur and onwards).

The parameters inputted in the input fields may set conditions by which the searching for matching candidates for answering the question may be carried out, where these conditions may be prioritized according to predefined prioritization rules (e.g. urgency may be more important than the professional level, therefore in a case where the urgency level is high and no online available professional repliers are found the system 100 may transmit the question to less professional users who are available).

According to some embodiments, the main discussion manager 200 may receive the data from those input fields and operate the matching module 220 according to the inputted data. For example, the matching module 220 may enable searching for suitable candidate users according to: (i) the inputted subject of the initiated message (and discussion) which may be matched with corresponding parts indicating the fields of expertise and hobbies of each user in the profiles of the users; (ii) the inputted urgency level of the question (meaning seeking for participants who are also available online); and (iii) the professional level of the candidate participates (which may also be deduced or extracted from users' profiles or part of the users' profiles).

Figure 3:
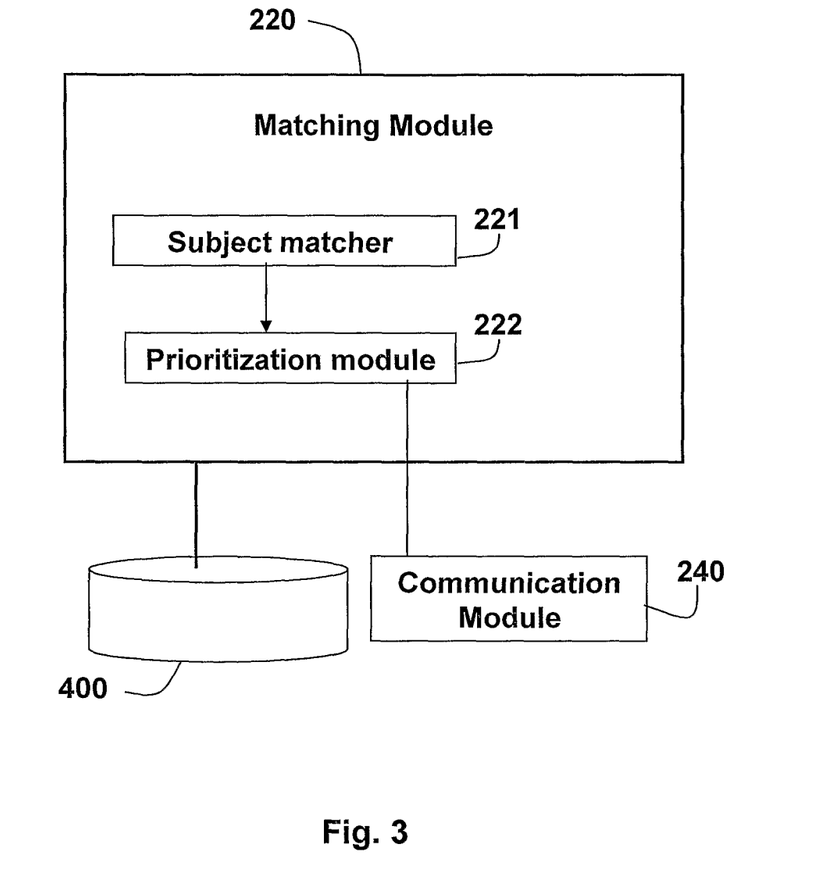
FIG. 3 schematically illustrates a matching module, for matching suitable participants to an initiated discussion, according to some embodiments of the invention.

Reference is now made to FIG. 3, which schematically illustrates the matching module 220, according to some embodiments of the invention. The matching module 220 may comprise (1) a subject matcher 221, enabling to identify the subject and field classification of the initial message and therefore determine the subject of the discussion session and match users according to the search rules, which enable to match users according to the users' profiles, history of participating in discussion session in the same subject, etc. to output all suitable users; and (2) a prioritization module 222 enabling to prioritize the output suitable candidates for participating in the discussion according to predefined prioritization rules. The prioritization rules may include sorting the suitable users outputted by the matcher 221, according to a descending value of rank, where the users of predefined "N" number of highest ranking may be selected as the first group with whom a first attempt of communication and opening of a discussion (using the communication module 240) may be made, where only if none of the users in the first group is available for communication (either according to their profile and history and/or according to online response-failure) a second less-prioritized group of users may be communicated such as users of lower ranking or users to which the subject of the discussion is a second option (e.g. users to whom the subject of the discussion session is a hobby and not a professional expertise etc.), depending on the prioritization rules.

Figure 4:
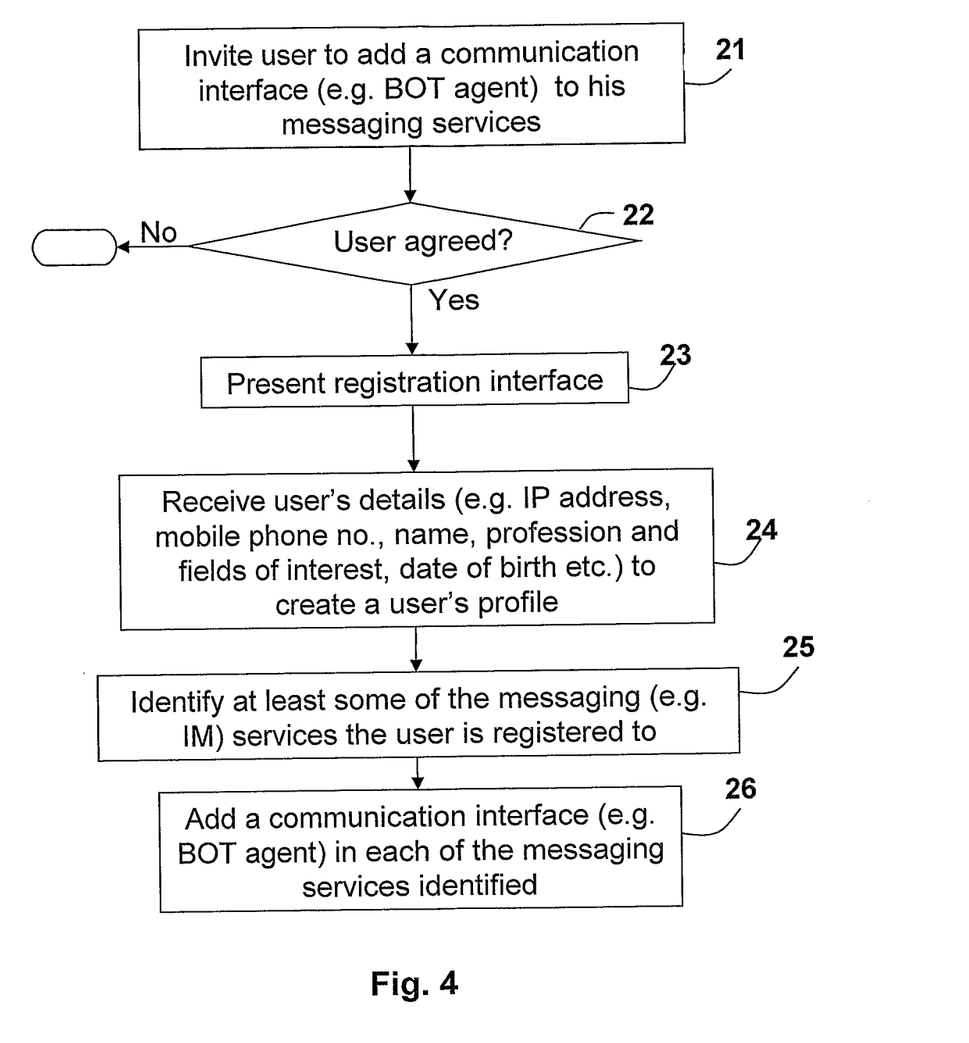
FIG. 4 is a flowchart, schematically illustrating a process for registering to the discussion service, according to some embodiments of the invention.

Reference is now made to FIG. 4, which is a flowchart, schematically illustrating a process for registering to the discussion service, according to some embodiments of the invention.

The registration process may comprise:

inviting the user to join the discussion service by agreeing to adding the CI to the messaging services the user is registered to 21 (e.g. where the invitation may be spread among users through the IM services);

once the user agrees to register 22, presenting a registration interface to the user 23 enabling the user to input personal details, fields of expertise and interest 23;

receiving the details inputted by the user 24 and creating a user's profile thereby; identifying at least some of the messaging services the user is using through the terminal used for registration 25 (this may be carried out automatically or manually by requesting the user to input the messaging services he uses and/or that he wishes to embed the CI 212 in); and embedding the CI (e.g. BOT agent) 121 in each of the identified messaging services 26.

Figure 5:
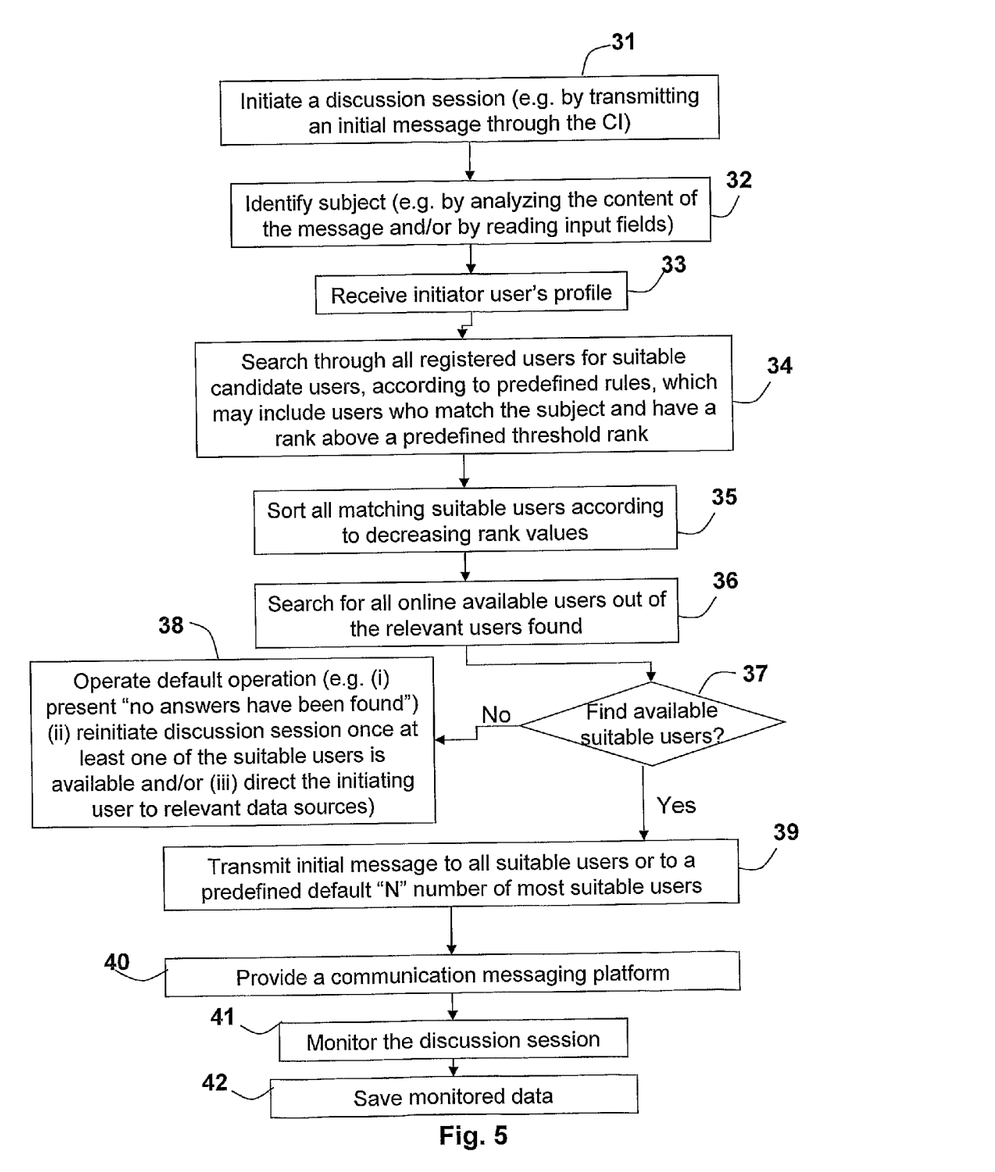
FIG. 5 is a flowchart, schematically illustrating a method of managing a discussion initiated by a user's question, according to some embodiments of the invention.

Reference is now made to FIG. 5, which is a flowchart, schematically illustrating a method of creating and managing a discussion initiated by a user's question, according to some embodiments of the invention.

The method may comprise:

initiating a discussion session (e.g. by inputting and transmitting an initial message through the CI) 31;

identifying the subject of the initial message and therefore the subject of the initiated discussion session 32;

receiving the profile of the initiator user 33;

searching through all registered users of various messaging services for suitable users for participating the initiated discussion session, according to the predefined rules 34 where the rules may include selecting users who have matching subjects as a professional field and/or as a field of interest or hobby and selecting the users who are assigned with a rank in relation to the subject which is higher than a predefined threshold rank;

sorting the matching users according to rank values (e.g. in an ascending rank values) 35;

searching for all available online suitable users 36;

if no available suitable users are found 37 a predefined default operation may be executed 38 such as, for example: (i) transmitting of a default announcement to the initiator user; (ii) reinitiating discussion session every predefined time-interval until at least one of the candidate suitable users responds; and/or (iii) directing the initiator user to other external relevant data sources associated with the subject;

if available relevant users are found 37—the initial message may be transmitted to these users or to a predefined "N" number of most suitable available users 39 (e.g. N number of highest rank users);

opening a discussion session (e.g. by providing a communication messaging platform for discussion) between the participating users (including the initiator user) 40; monitoring the discussion session 41; and saving the monitored data 42.

The identification of the subject of the discussion session (step 32) may be carried out by at least one of:

analyzing the content (e.g. the text) of the initial message to find meaningful terms/word(s) in the message, for example, by eliminating prepositions and conjunctions, adjectives, etc. and optionally analyzing the meaning of the terms/words that were not eliminated; and/or receiving a selected subject from the initiator user, which has manually selected the subject out of a predefined list of subjects.

The suitability of users for participating in the discussion session may include the relevancy of the users and the availability of the users to participate within a predefined time limit, in relation to the subject of the discussion. The relevancy may be calculated according to the profile of the users (e.g. whether his profession or knowledge is in the subject field of the initial message. The relevancy may further include the historical behavior of the user in participating in discussions of the same field which may indicated by a calculated factor (e.g. the rank of the user).

According to some embodiments, the rules for searching and matching suitable users for participating in the initiated discussion session may further depend on the initiator user's profile and other features relating to his initial message, which the user may be able to input when transmitting the initial message, such as the urgency of the question, conditions for the users the questioner wishes to answer his question, etc.

Figure 6:
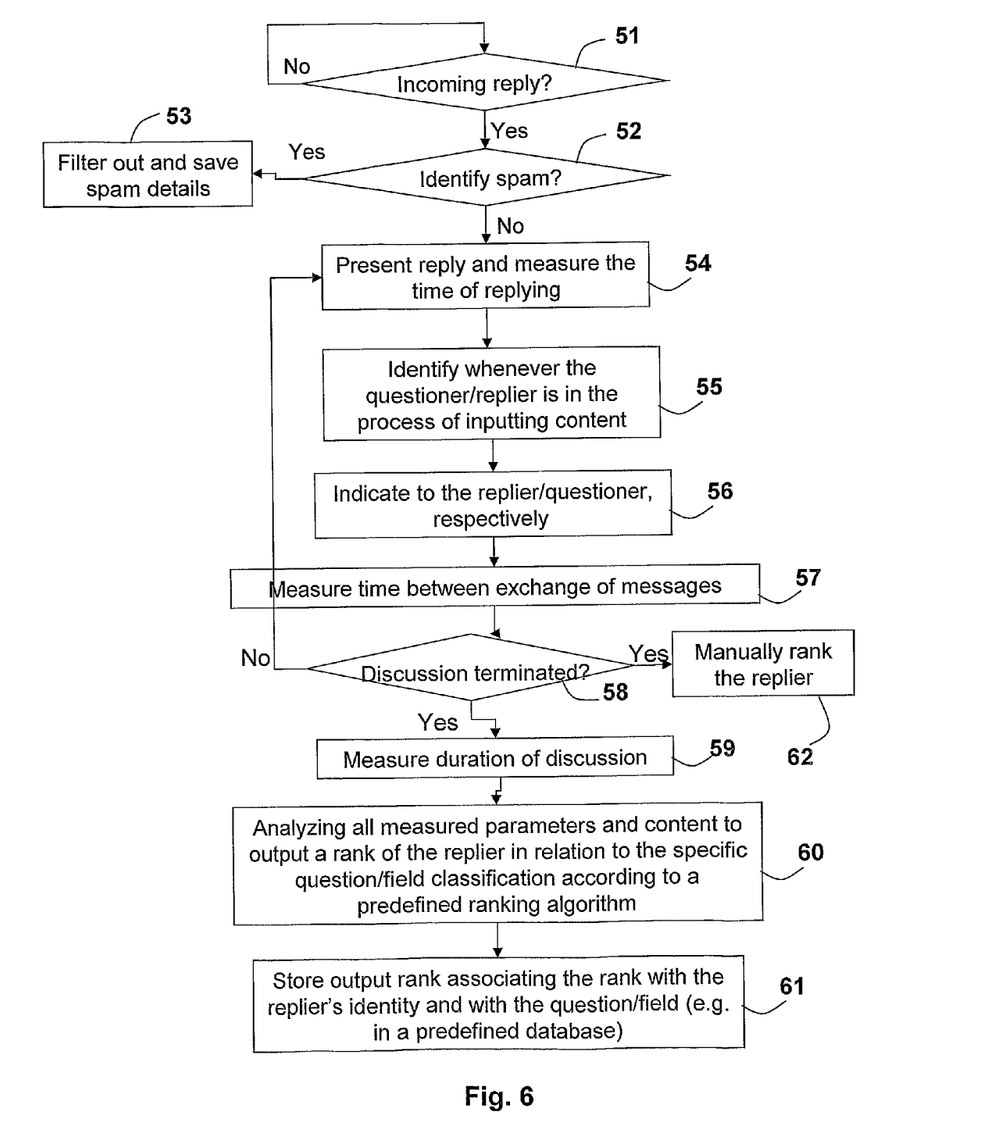
FIG. 6 is a flowchart, schematically illustrating a process of monitoring a discussion between a first user initiating the discussion and a second user participating in the discussion, according to some embodiments of the invention.

Reference is now made to FIG. 6, which is a flowchart, schematically illustrating a process of monitoring a discussion between an initiator user and another user participating in a discussion session initiated by the initiator user, using an IM service enabling transmission of text messages, according to some embodiments of the invention. The monitoring process may comprise:

identifying an incoming reply (to the initial message transmitted by the initiator user) 51;

identifying spam or as an unauthorized reply due to any other reason 52 (e.g. by operating a spam detecting algorithm predefined in the system 100)—filtering the reply and saving the replier's details and other related details 53 (such as time of transmission etc.);

if the reply is identified as legal 52—presenting the reply to the initiator user and measuring the time it took it to arrive 54;

identifying whenever either one of the participants is in the process of inputting content (e.g. by typing a text message and the like) 56 and indicating to the other participant that the user is in the process of inputting a response message 56;

measuring time between any exchange of messages 57;

if the discussion is terminated 59—measuring the duration of the entire discussion session 59, otherwise—returning to presenting the reply to the initiator user and measuring the time it took it to arrive 54;

analyzing the content of the discussion and all measured parameters to calculate and associate a rank to each of the participating users, where the rank is associated with the subject of the discussion as well 60; and storing the outputted ranks and their associated users and subject (e.g. in a predefined database) 61.

According to embodiments, the ranking can be made manually by the participants 62 where the manually inputted rank may be added to the calculations of the overall rank or replace the analysis and calculations of an overall ranking of the replier in relation to the question.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method of creating online discussion sessions between users of multiple electronic messaging services, wherein said discussion session includes exchange of messages between at least two users in the context of a predefined subject within a limited defined time period, said method comprising:

embedding a communication interface (CI) to each user's messaging service, wherein said communication interface is a virtual entity enabling to establish a discussion session through a main discussion manager module, which supports managing discussion sessions between users who communicate by using different messaging services;

initiating a discussion session, wherein the discussion initiated by a virtual entity or human entity (an initiating entity) using embedded communication interface and defining the discussion subject by creating a message using the messaging service interface;

transmitting said inputted message through at least one messaging service provider, wherein said message is transmitted by the embedded communication interface to the main discussion manager module;

initiating a real time automatic search for identifying suitable other candidate users for participating in the initiated discussion session, associated with said defined object, according to predefined rules, and wherein said suitability includes a combination of relevancy of the other users for participating in the defined discussion session, according to said defined object, and availability of the other users to participate, wherein candidate users are not required to be in messaging service's friends-list of any of the other initiating or candidate users; and creating and managing an online discussion session of message exchange between an initiating entity, such that, the initiating entity and identified suitable other candidate users are participating in the discussion, using different messaging services, wherein said main discussion manager supports a discussion platform, utilizing different messaging services, wherein the creating and the managing of the discussion session is performed on at least one main server wherein the parameters of the discussion are further analyzed to enable ranking the discussion and therefore ranking the participating users in relation to the subject of the discussion defined by the imitating user, thereby storing a history of ranks related to each participating user in relation to each subject.

2. The method of claim 1, further comprising providing the user with an interface to allow the user to voluntarily embed the communication interface in the messaging services the user is registered in.

3. The method of claim 1, further comprising real time monitoring discussion between users by analyzing parameters related to each discussion session.

4. The method of claim 3, wherein said parameters are at least one of: duration of the discussion; time period between exchanges of messages within the discussion; content of the discussion; ranking of the discussion inputted by the user who transmitted the question; level of involvement of each participant.

5. The method of claim 1, further comprising presenting an indicator to at least one of the users participating in the discussion session whenever one of the participating users is in the process of inputting content.

6. The method of claim 1, further comprising presenting an indicator of availability status of each user participating in the discussion session to other participating users, and updating said indication whenever a change of availability status occurs.

7. The method of claim 1, wherein said rules for searching for suitable other candidate users for participating said initiated discussion session include searching for users of the most suitable rank in relation to the subject of the initiated discussion session transmitted and according to the availability of the most suitable candidate participants.

8. The method of claim 1, further comprising inputting data through input fields presented to the discussion initiator user via the communication interface, enabling the user initiating the discussion session to define parameters according to which the search for suitable users for participating in the discussion session is carried out.

9. The method of claim 1, wherein said different messaging services include at least two different instant messaging (IM) services, wherein the user IM identity is used by the discussion manager as a unique identifier.

10. The method of claim 1, wherein said communication interface includes a BOT agent, which performs as a virtual IM service user and wherein said embedding includes adding said BOT agent as a virtual friends-list of the IM service of the user.

11. The method of claim 1, wherein the users participating in each discussion session are anonymous, represented in the discussion session by an indicator.

12. The method of claim 1, wherein said main discussion manager further enables to manage and monitor each discussion session and invite other user to participate in discussions according monitored parameters of the discussion.

13. The method of claim 1, further comprising the step of enabling predefined administrators to manage and participate in the discussion session.

14. The method of claim 1, wherein the main discussion module supports discussion between users in at least one specific website, wherein said website includes at least one interface enabling the user to join the discussion services.

15. The method of claim 1, wherein said managing includes terminating the discussion session according to predefined termination rules influencing said time period of the discussion session.

16. A computer implemented method of creating online discussion sessions between users of multiple electronic instant messaging (IM) services, wherein said discussion session includes exchange of messages between at least two users in the context of one pre-defined subject within a defined time period, said method comprising:

embedding a communication interface (CI) to each user's IM service, wherein said communication interface is a virtual entity enabling to establish a discussion session through a main discussion manager, which supports managing said discussions between users, which communicate by using different messaging services;

initiating a discussion session, wherein the user initiates the discussion (initiating user) by selecting said embedded communication interface and defining the discussion subject by creating a massage using the IM service interface;

transmitting said inputted message, wherein said message is transmitted by the embedded communication interface and the messaging service to the main discussion manager;

initiating a real time automatic search for identifying other suitable candidate users for participating in the initiated discussion session, associated with said defined subject, according to predefined rules, wherein said main discussion manager carries out said search, and wherein said suitability includes a combination of relevancy of the other users for participating in the defined discussion session, according to said defined subject, and availability of the other users to participate, wherein the users are not required to be in messaging service's friends-list of each other; and creating and managing an online discussion session between the user and at least one identified suitable other candidate user, using different IM services, wherein said main discussion manager supports the discussion by providing the users with a discussion platform, which enables utilizing different IM service for exchanging messages through said discussion manager between the users participating in the initiated discussion session, wherein the creating and the managing of the discussion session is performed on at least one main server, wherein said termination rules include at least one of: discussion duration limits, which include measuring the time that passes between last massage and current time and terminating the discussion session if the measured time-interval between the last message and the current time exceeds a predefined threshold; and users' behavior in the discussion, which include identification of termination related terms in the content of the messages in the discussion.

17. A system for creating online discussion sessions between users of multiple electronic messaging service, wherein said discussion session includes exchange of messages between at least two users in the context of a predefined subject within a limited defined time period, said system comprising:

at least one communication interface;

a main discussion manager for embedding a communication interface (CI) to each user's messaging service, wherein said communication interface is a virtual entity enabling to establish a discussion session through a main discussion manager module, which enables managing discussion sessions between users, wherein users communicate by using different messaging services wherein the discussion initiated by a virtual entity or human entity using embedded communication interface and defining the discussion subject by creating a message using the messaging service interface, wherein the at least one communication interface allows transmitting said inputted message through at least one messaging service provider, wherein said message is transmitted by the embedded communication interface to the main discussion manager module, wherein the main discussion manager is further for initiating a real time automatic search for identifying other suitable candidate users for participating in the initiated discussion session, associated with said defined object, according to predefined rules, and wherein said suitability includes a combination of relevancy of the other users for participating in the defined discussion session, according to said defined object, and availability of the other users to participate, wherein candidate users are not required to be in messaging service's friends-list of any of the other initiating or candidate users, and wherein the communication interface is for creating and managing an online discussion session of message exchange between an initiating entity, such that, the initiating entity and identified suitable other candidate users are participating in the discussion, using different messaging services, wherein said main discussion manager supports a discussion platform, utilizing different messaging service.

* * * * *